(12) United States Patent
Ren et al.

(10) Patent No.: US 11,361,529 B2
(45) Date of Patent: Jun. 14, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Beili Ren, Kanagawa (JP); Shunichi Kimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 262 days.

(21) Appl. No.: 16/548,799

(22) Filed: Aug. 22, 2019

(65) Prior Publication Data

US 2020/0242389 A1  Jul. 30, 2020

(30) Foreign Application Priority Data

Jan. 24, 2019  (JP) ............................. JP2019-010053

(51) Int. Cl.
*G06V 10/30* (2022.01)
*G06V 30/148* (2022.01)
*G06V 30/10* (2022.01)

(52) U.S. Cl.
CPC ............ *G06V 10/30* (2022.01); *G06V 30/158* (2022.01); *G06V 30/10* (2022.01)

(58) Field of Classification Search
CPC ...... G06V 10/30; G06V 10/82; G06V 30/158; G06V 30/10; G06V 30/287; G06V 20/62; G06V 30/133; G06V 30/00; G06V 30/293; G06K 9/40; G06K 9/348; G06K 9/325; G06K 2209/01; G06K 2209/011; G06K 2209/013
See application file for complete search history.

(56) References Cited

U.S. PATENT DOCUMENTS

| 6,212,299 B1 * | 4/2001 | Yuge | G06V 10/768 |
| | | | 382/229 |
| 2011/0013847 A1 * | 1/2011 | Statsenko | G06V 10/457 |
| | | | 382/224 |

FOREIGN PATENT DOCUMENTS

| JP | H05-6461 | | 1/1993 | |
| JP | H0749926 A | * | 2/1995 | |
| JP | 2000295406 A | * | 10/2000 | ........... G06K 9/2054 |
| JP | 2004110128 A | * | 4/2004 | |
| JP | 2006-072839 | | 3/2006 | |
| JP | 3837193 B2 | * | 10/2006 | |
| JP | 4275866 B2 | * | 6/2009 | |
| JP | 2011022938 A | * | 2/2011 | |

* cited by examiner

*Primary Examiner* — Carol Wang
(74) *Attorney, Agent, or Firm* — JCIPRNET

(57) ABSTRACT

An information processing apparatus includes a processor configured to obtain, for each character of plural characters recognized from an image, (a) position of the character in the image, (b) size of the character, and (c) confidence level of a character recognition result of the character; and determine whether to regard the character as a noise based on a distance between the character and its nearest character, the size of the character, and the confidence level of the character recognition result of the character.

7 Claims, 4 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-010053 filed Jan. 24, 2019.

BACKGROUND

(i) Technical Field

The present disclosure relates to an information processing apparatus and a non-transitory computer readable medium.

(ii) Related Art

In character recognition, recognition accuracy is increased by removing a noise, which is not a character, from a subject image.

In a method described in Japanese Unexamined Patent Application Publication No. 5-6461, compressed data is obtained by reading a form document, extracting character image data, and compressing the character image data into image data with a half size in length and width. Then, extracted data is obtained by extracting a maximum pixel block from the compressed data and hence removing the other components. The maximum pixel block is expanded into the original pixel size again, and then the logical product (AND) with respect to the original image data is obtained. Thus, even a relatively large noise is not recognized as a character component and may be removed. Moreover, the image compression decreases the number of pixels to be processed, thereby increasing the processing speed. Furthermore, since the logical product (AND) with respect to the original image data is finally obtained, an original faded portion of a character is restored, and the shape of an end point may be maintained.

In a method described in Japanese Unexamined Patent Application Publication No. 2006-72839, a range in which an isolated-point noise is searched from an input image is determined, a circumscribed rectangle is extracted from the determined range, a candidate rectangle of an isolated-point noise is extracted from the extracted circumscribed rectangle, further a character rectangle candidate is extracted from the extracted circumscribed rectangle, the isolated-point noise is determined based on the relationship between the extracted isolated-point noise candidate rectangle and its peripheral rectangle, similarly the isolated-point noise is determined based on the relationship between the extracted character rectangular candidate and its peripheral rectangle, and the determined isolated-point noise is removed.

In a method of determining whether a character candidate portion in an input image is a character or a noise based on the size of the character candidate portion and the distance from its neighboring character candidate portion, determination may be erroneously made such that, for example, a non-character object with a large size is not determined as a noise but is determined as a character, or a character at a position separated from its neighboring character is determined as a noise.

SUMMARY

Aspects of non-limiting embodiments of the present disclosure relate to providing a technology for reducing erroneous determination as compared with the method of determining whether to regard a subject as a character or a noise based on the size and distance of the subject.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to obtain, for each character of a plurality of characters recognized from an image, (a) position of the character in the image, (b) size of the character, and (c) confidence level of a character recognition result of the character; and determine whether to regard the character as a noise based on a distance between the character and its nearest character, the size of the character, and the confidence level of the character recognition result of the character.

BRIEF DESCRIPTION OF THE DRAWINGS

An exemplary embodiment of the present disclosure will be described in detail based on the following figures, wherein.

DETAILED DESCRIPTION

An example of a system configuration including an information processing apparatus according to an exemplary embodiment of the present disclosure is described with reference to FIG. 1.

Figure 1:
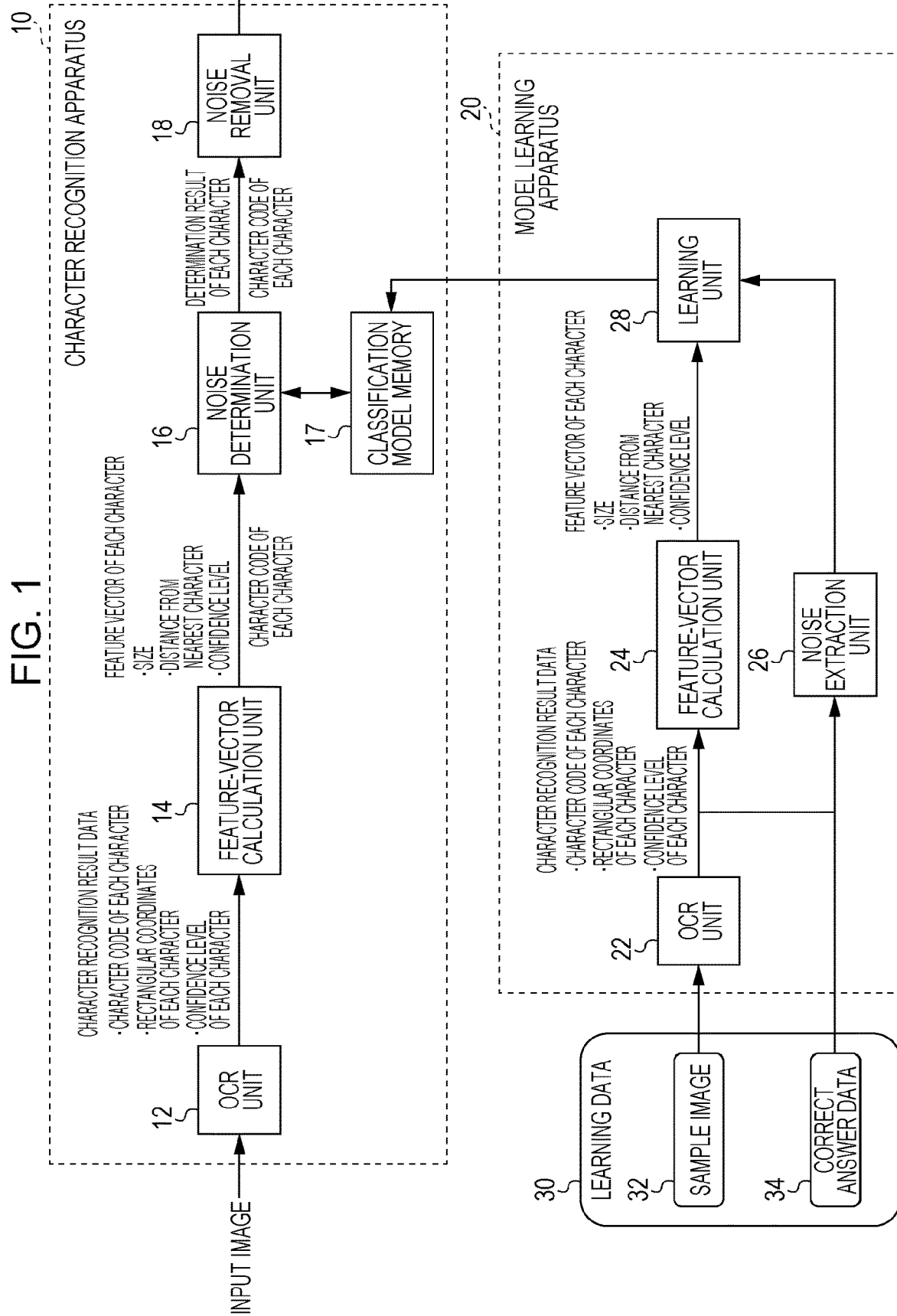
FIG. 1 exemplarily illustrates a configuration of a system according to an exemplary embodiment.

The system in FIG. 1 includes a character recognition apparatus 10 and a model learning apparatus 20.

The character recognition apparatus 10 performs character recognition on an image that is a processing subject by using technologies such as optical character recognition (OCR) to recognize a plurality of characters from the image.

An input image including an image of a string of characters is input to the character recognition apparatus 10. The input image is, for example, an image obtained by a scanner reading a paper face of a form. In the following example, it is assumed that an image obtained by extracting a region including a string of characters subjected to character recognition (for example, a specific write-in column) from an image obtained by reading a paper face is input as an input image to the character recognition apparatus 10. The input image is, for example, an image of a strip-shaped region including one line of a string of characters.

A string of characters included in an input image is typically a string of characters including hand-written characters. However, this is merely an example. The character recognition apparatus 10 may recognize a string of typed characters included in an input image, or a string of characters in which hand-written characters and typed characters are mixed. A string of characters is a string of characters including one or more characters. Characters subjected to character recognition may include various types of phonetic characters, such as alphabetical characters, Hiragana characters (Japanese simple characters), and Katakana characters (Japanese simple characters based on foreign word sounds); ideographic characters such as Kanji characters (Chinese characters); and various types of marks such as logo marks.

The character recognition apparatus 10 according to this exemplary embodiment has a function of recognizing a noise included in an input image, and removing a character recognition result for a portion corresponding to the noise.

In this case, a noise is an image element other than a character among image elements included in an input image. For example, a typical monochrome image is considered as an input image subjected to character recognition. The monochrome image includes coupling components of black pixels. A noise is a coupling component included in the coupling components and not corresponding to a character or a portion of a character (for example, in a case of an alphabetical character "i", an upper dot or a lower vertical line). For example, in a case of an input image 100 exemplarily illustrated in FIG. 2, a noise 102 is a coupling component of black pixels located at a position slightly separated from the right side of a string of nine hand-written Kanji characters.

A noise is generated due to various factors. Examples of the factors are a written mistake by a user, and an element other than the characters written by a user (for example, an underline or a frame of a box surrounding characters). Moreover, a bend or a dirt of a paper face of a write-in column, or a reading noise due to a scanner when the paper face is read by the scanner may cause a noise in an input image.

This exemplary embodiment is subjected to detection and removal of particularly an isolated-point noise among noises. The isolated-point noise represents a noise at a position separated from a string of characters in an input image by a certain distance or more (that is, by a previously set threshold or more). The situation of being separated from a string of characters by a threshold or more represents that the distance between a noise and one of the characters included in an input image, the one being the nearest to the noise, is the threshold or more. It is to be noted that whether the distance is the distance corresponding to of an isolated point or not depends on the size of the character. Regarding a large character and a small character, although the absolute distance between the characters and the noises are the same, the noise likely seems to relatively near to the large character and likely seems not to be isolated, whereas the noise likely seems to be relatively separated from the small character and likely seems to be isolated. To remove the difference depending on the size of character, when an isolated-point noise is determined, the distance from a string of characters to a noise is normalized with reference to, for example, the size of the characters constituting the string of characters.

Figure 2:
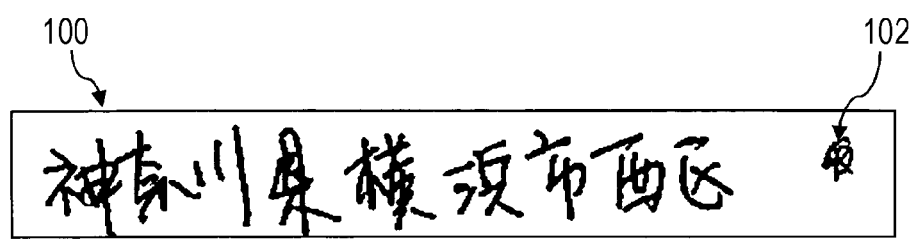
FIG. 2 illustrates an example of an input image including a noise.
Figure 3:
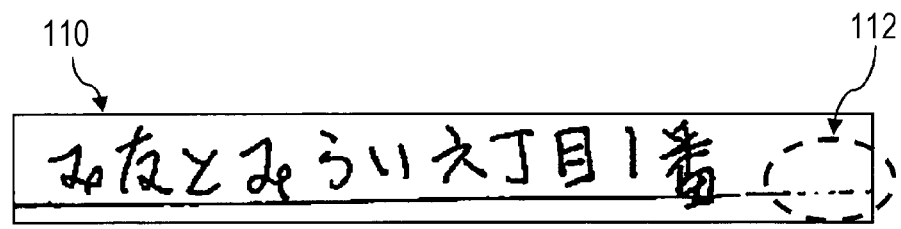
FIG. 3 illustrates another example of an input image including a noise.

The noise 102 exemplarily illustrated in FIG. 2 is separated from the string of characters by a certain distance, and corresponds to an isolated-point noise. In an input image 110 illustrated in FIG. 3, a string of hand-written characters including Hiragana characters, Kanji characters, and a number are underlined, and the right end of the underline is faded. A string of a plurality of black dots included in the faded portion (enclosed by an elliptical broken-line frame 112 in FIG. 3) is separated from the string of hand-written characters and hence corresponds to an isolated-point noise. In contrast, a body part of the underline is located at a position near to the lower side of the string of hand-written characters and hence does not correspond to an isolated-point noise.

In the following description, a term "noise" represents an isolated-point noise for the convenience of description.

Referring back to FIG. 1, the character recognition apparatus 10 includes an OCR unit 12, a feature-vector calculation unit 14, a noise determination unit 16, a classification model memory 17, and a noise removal unit 18.

The OCR unit 12 performs character recognition on an image by using technologies such as OCR to recognize a plurality of characters from the image. The OCR unit 12 is an example of "character recognition means". The OCR unit 12 obtains, for example, for each recognized character, (1) the character recognition result of the character (an example is a character code), (2) the rectangular coordinates of the character, and (3) the confidence level of the character recognition result. That is, the output data by the character recognition of the OCR unit 12 includes the three types of data.

The rectangular coordinates of a character are coordinate information representing a circumscribed rectangle of the character in an input image. The circumscribed rectangle of a character is a rectangle defined by segments parallel to the x axis and y axis of an input image, and circumscribes the character. The rectangular coordinates are a set of the coordinates of a plurality of points that specify the circumscribed rectangle. For example, the rectangular coordinates are a pair of the coordinates of the upper right and lower left vertices of the circumscribed rectangle. When the OCR unit 12 recognizes each character in an input image, the OCR unit 12 recognizes the circumscribed rectangle of each character and determines the rectangular coordinates representing the circumscribed rectangle.

The confidence level is a level indicating confidence of whether the character code obtained by the OCR unit 12 correctly represents the character in an input image. The character code is more highly probable to be correct (that is, to correctly represent the string of characters in an input image) as the confidence level is higher. The OCR unit 12 calculates the confidence level that is one item of the output data by the character recognition.

The feature-vector calculation unit 14 calculates a feature vector for each character recognized by the OCR unit 12. The feature vector contains three features of a character: (1) size of the character, (2) distance from its nearest character, and (3) confidence level of a recognition result of the character.

The size of the character is the size of the circumscribed rectangle of the character in an input image. For the size of the circumscribed rectangle, for example, the length of the diagonal of the circumscribed rectangle, or the area of the circumscribed rectangle may be used. When a noise is determined, the correlation of the relative size of a character or a noise is more important than the absolute size thereof. Thus, a normalized value is used for the size of a character. The normalization may be performed, for example, by dividing the size of each character in an input image by a representative size of the input image (for example, the size of the input image or the size of the maximum character among the characters in the input image).

The distance from the nearest character is the distance between the circumscribed rectangle of the character and the circumscribed rectangle of another character that is the nearest to the character. For the distance between the circumscribed rectangles of the two characters, for example, the distance between representative points of the circumscribed rectangles may be used. The representative points of the circumscribed rectangles may be previously determined as, for example, the upper right vertices of the circumscribed rectangles or the center points of the circumscribed rectangles. In the viewpoint of determination on an isolated point, the correlation between the relative sizes between characters is more important than the absolute value of the distance of the characters. Thus, for the distance from the nearest character, a value is used, the value being obtained by normalizing the actual value of the distance in the input image by using the representative size (for example, the height of the input image, or the size of the maximum character in the input image).

The feature-vector calculation unit 14, by using the rectangular coordinates of each character determined by the OCR unit 12, calculates for each character the size of the character, and the distance between the character and the nearest character. The feature-vector calculation unit 14 generates a feature vector having, as components, the size and distance, and the confidence level calculated by the OCR unit 12; and outputs the generated feature vector to the noise determination unit 16. Moreover, the feature-vector calculation unit 14 outputs the character code of each character obtained by the OCR unit 12 to the noise determination unit 16. The feature-vector calculation unit 14 outputs a character code group and a feature vector group to the noise determination unit 16 in a manner that the character code and the feature vector of the same character may be associated with each other.

The noise determination unit 16 is an example of "determination means" and determines, based on the feature vector of each input character, whether the character is a noise or not. That is, a portion of the input image recognized as a character by the OCR unit 12 may include temporarily a noise in the input image, as a character, and the OCR unit 12 may obtain the character code for the noise. However, the noise determination unit 16 classifies temporarily determined characters as described above into an actual character and a noise. The noise determination unit 16 performs determination by using a classification model stored in the classification model memory 17.

The classification model is a model that is used for classifying a character into a noise or an actual character based on the feature vector of the character.

In an example, information representing a region that is in a three-dimensional space having coordinate axes representing the three components of a feature vector and in which a feature vector of a character to be determined as a noise (hereinafter, referred to as noise region) is used as the classification model. Noise regions in a three-dimensional space are determined for classification models such that, for example, if the confidence level is in a range from c1 (inclusive) to c2 (exclusive), a region in which the size s1 or smaller and the distance from the nearest character is d1 or larger is a region of a noise; and if the confidence level is in a range from c2 (inclusive) to c3 (exclusive), a region in which the size is s2 or smaller and the distance from the nearest character is d2 or larger is a region of a noise. In this case, if the feature vector obtained by the feature-vector calculation unit 14 is in the noise region, the noise determination unit 16 determines that the character is a noise, or otherwise determines that the character is an actual character.

Alternatively, the classification model may define an actual character region. in which a feature vector of a character to be determined as an actual character in the above-described three-dimensional space (hereinafter, referred to as character region) is present. In this case, if the feature vector obtained by the feature-vector calculation unit 14 is in the character region, the noise determination unit 16 determines that the character is an actual character, or otherwise determines that the character is a noise.

Still alternatively, the classification model may represent the noise region and the character region in the above-described three-dimensional space. The noise region does not overlap the character region. Moreover, a gray region that does not belong to the noise region or the character region may be provided. If the feature vector obtained by the feature-vector calculation unit 14 is in the character region, the noise determination unit 16 determines that the character is an actual character, or if the feature vector is in the noise region, the noise determination unit 16 determines that the character is a noise. If the feature vector obtained for a character is located in the gray region, the noise determination unit 16 may determine that the character is "a gray-region character".

The noise determination unit 16 associates the character code of each character received from the feature-vector calculation unit 14 with the determination result for the character, that is, the information indicating whether the character is "a noise" or "an actual character", and outputs the associated determination result to the noise removal unit 18. If a classification model includes a gray region, the noise determination unit 16 may output the determination result as "a gray-region character".

The information on the noise region, the character region, or both exemplarily described above is an example of "range information" for specifying the range of coordinates corresponding to a noise from among recognized characters.

The classification model may be a neural network that receives a feature vector as an input and outputs a determination result of whether the feature vector is a noise or an actual character. In this case, the noise determination unit 16 constitutes a neural network of a classification model by using data stored in the classification model memory 17, inputs the feature vector of each character into the neural network, and hence obtains a determination result indicating whether the each character is a noise or an actual character.

The noise removal unit 18 removes a noise form a character recognition result included in the output data from the OCR unit 12, based on the information input from the noise determination unit 16. For example, for each pair of an input character code and a determination result, the noise removal unit 18 outputs the character code if the determination result is "an actual character", and removes the character code if the determination result is "a noise". That is, the noise removal unit 18 does not output a character determined as "a noise". In this way, the noise removal unit 18 outputs a string of character codes of the residual characters after the character determined as "a noise" is removed. The output string of character codes is used by various types of application programs.

In the example in which the noise determination unit 16 determines a character recognition result as one of three classifications of "a noise", "an actual character", and "a gray-region character", for a character determined as "a gray-region character", the noise removal unit 18 may output the character code of the character together with a flag indicating "a gray-region character". In this case, an application program that receives the output has a rule of how to handle a character code with the flag as "a gray-region character". For example, in a certain application program, a character code with the flag of a gray-region character is simply removed; and in another application program, a window is displayed for requesting a user to confirm the character code with the flag of a gray-region character.

Figure 4:
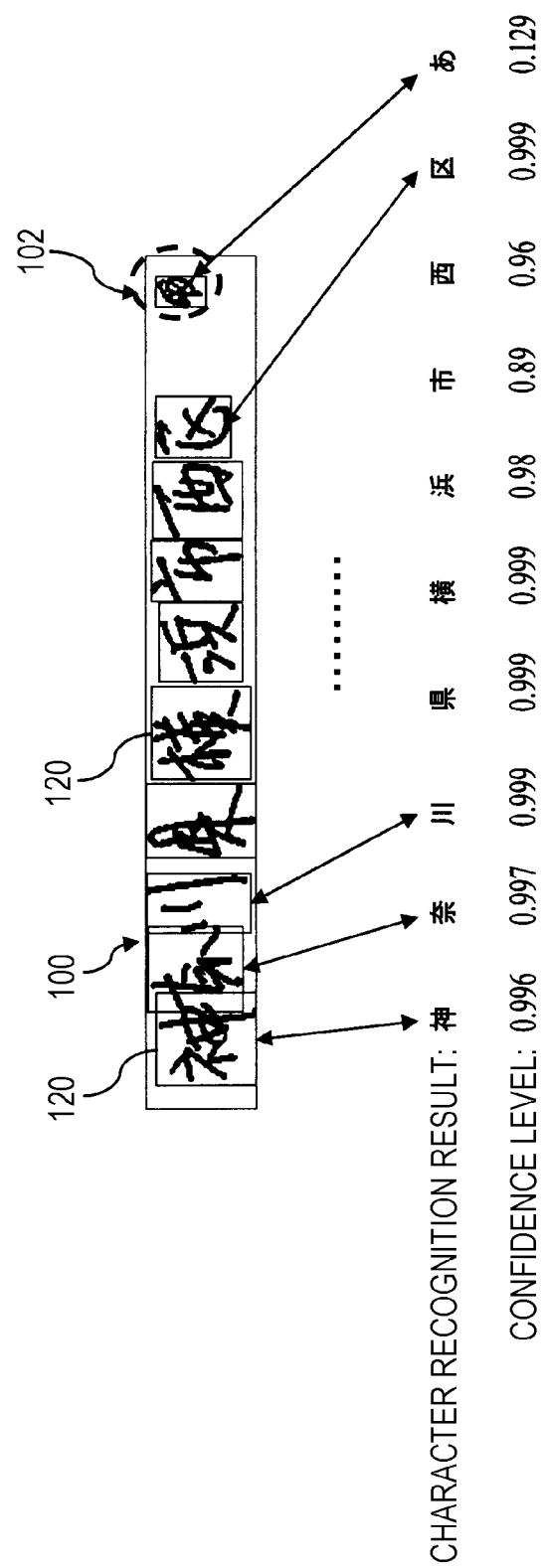
FIG. 4 exemplarily illustrates a character recognition result for the input image illustrated in FIG. 2.

FIG. 4 illustrates an example of a character recognition result by the character recognition apparatus 10. This example corresponds to the input image 100 exemplarily illustrated in FIG. 2. The OCR unit 12 obtains a circumscribed rectangle 120 for each of nine hand-written characters disposed side by side in the order from the left in the input image 100. Based on information on the circumscribed rectangles, information on the size of the character and the distance from the nearest character is obtained. For the nine characters (in this case, Kanji characters), respective character codes " 神 (ka)", " 奈 (na)", " 川 (gawa)", " 県 (ken)", " 横 (yoko)", " 浜 (hama)", " 市 (shi)", " 西 (nishi)", and " 区 (ku)" of the character recognition results are obtained. The confidence levels of the nine characters are as high values as 0.996, 0.997, . . . , and 0.999. A confidence level takes a real number value from 0 to 1. A confidence level is more highly probable to be correct as the real number value is nearer to 1. For the nine characters, the noise determination unit 16 determines that the nine characters correspond to actual characters based on the three components of the size, the distance from the nearest character, and the confidence level. For a coupling component of black pixels at the right end in the input image 100 (that is, the noise 102), the OCR unit 12 recognizes the coupling component as a character code (Hiragana character code) " あ (a)". However, the confidence level of the character recognition is 0.129, which is very low. The noise determination unit 16 determines that the result recognized as the character " あ (a)" is a noise based on the size of the character " あ (a)", the distance from the nearest character (that is, the ninth character " 区 (ku)" from the left), and the confidence level 0.129.

Figure 5:
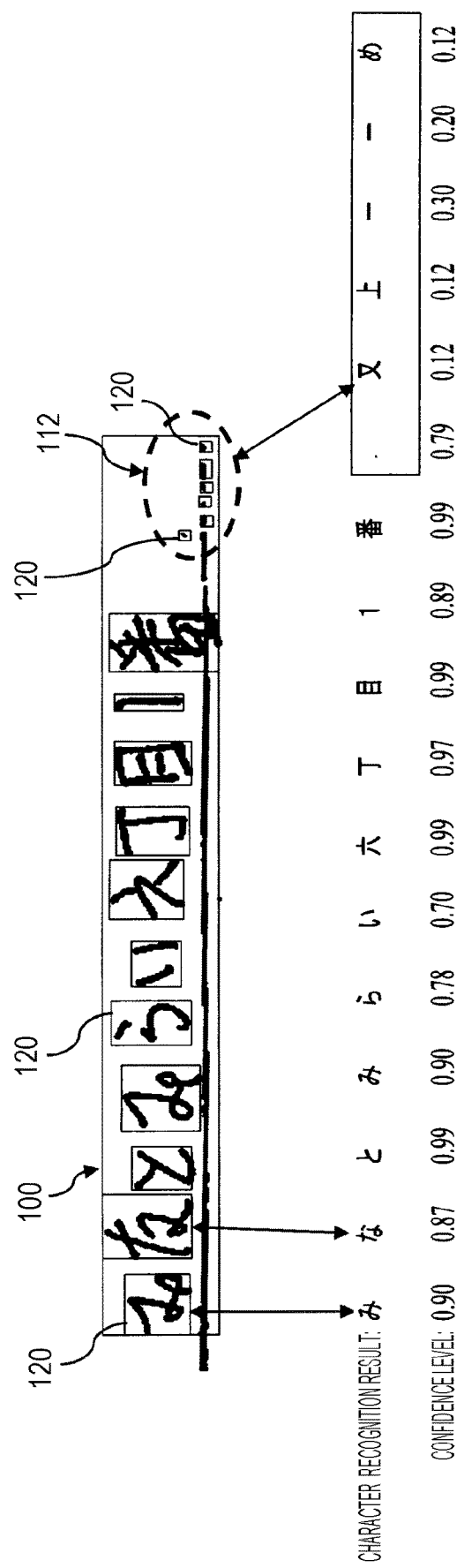
FIG. 5 exemplarily illustrates a character recognition result for the input image illustrated in FIG. 3.

FIG. 5 illustrates another example of a character recognition result by the character recognition apparatus 10. This example corresponds to the input image 100 exemplarily illustrated in FIG. 3. For the eleven characters disposed side by side in the order from the left in the input image 100, the noise determination unit 16 determines that the eleven characters correspond to actual characters based on the three components of the size, the distance from the nearest character, and the confidence level. In contrast, for six small coupling components in the frame 112 located near the right end in the input image 100, the OCR unit 12 recognizes "-", " 又 (mata)", " 上 (ue)", "—", "—", and " め (me)" (Kanji characters, Hiragana characters, and marks). Among the characters, the first character recognition result "-" has a high confidence level 0.79, whereas the other character recognition results have low confidence levels, one of which is 0.30 even at the maximum level. The noise determination unit 16 determines, for example, the character recognition result "-" of the coupling component at the left end in the frame 112 as "a noise" by taking into consideration the size and the distance from the nearest character (that is, the eleventh character " 番 (ban)" (Japanese Kanji character) from the left) although the confidence level of the character recognition result "-" is as relatively high as 0.79. In addition, the noise determination unit 16 determines the residual five character recognition results in the frame 112 as noises based on the size, the distance from the nearest character (that is, from " 番 (ban)"), and the confidence level of each character recognition result.

Referring back to FIG. 1, the model learning apparatus 20 is described. The model learning apparatus 20 performs learning for generating a classification model that is stored in the classification model memory 17.

The model learning apparatus 20 includes an OCR unit 22, a feature-vector calculation unit 24, a noise extraction unit 26, and a learning unit 28.

The model learning apparatus 20 receives, as inputs, learning data 30 including a sample image 32 and correct answer data 34. The sample image 32 is data representing an image of a string of characters including hand-written characters and so forth and subjected to character recognition. The sample image 32 includes a string of characters and an image element that is a noise. The correct answer data 34 is data indicating the correct answer of the character recognition result for the sample image 32. That is, the correct data includes a string of character codes representing a string of characters indicated in the sample image. Characters in sample images may be referred to as "sample image characters".

The learning data 30 includes multiple pairs of the sample image 32 and the correct answer data 34.

The OCR unit 22 performs character recognition on an image by using technologies such as OCR to recognize a plurality of characters from the image. The OCR unit 22 is a character recognition device having performance equivalent to that of the OCR unit 12 in the character recognition apparatus 10. That is, when the same input image is input to the OCR units 12 and 22, the OCR units 12 and 22 output the same character code, the same rectangular coordinates of a circumscribed rectangle, and the same confidence level. The OCR unit 22 receives individual sample images 32 included in learning data 30, and performs character recognition on the sample images 32.

The feature-vector calculation unit 24 calculates feature vectors for the character recognition results of the characters by the OCR unit 22 by performing the same processing as the processing of the feature-vector calculation unit 24 in the character recognition apparatus 10. The calculated feature vectors are output to the learning unit 28.

The noise extraction unit 26 receives, as inputs, correct answer data 34 and the character recognition results by the OCR unit 22. The noise extraction unit 26 extracts a noise from the character recognition results of the input characters by referring to the correct answer data 34. For example, the noise extraction unit 26 extracts, as a noise, a character not included in a string of correct characters indicated by the correct answer data 34 from among the characters in the string of characters of the character recognition results for the sample image output by the OCR unit 22. In this case, the noise extraction unit 26 determines that a character included in the string of correct characters indicated by the correct answer data 34 among the character recognition results by the OCR unit 22 is an actual character. For each character recognition result by the OCR unit 22, the noise extraction unit 26 outputs extraction result information indicating whether the character recognition result is a noise or an actual character, to the learning unit 28.

The learning unit 28 learns a classification model based on the feature vector of each character input from the feature-vector calculation unit 24 and the extraction result information for each character input from the noise extraction unit 26.

In an example, this learning plots coordinate points represented by a feature vector in a three-dimensional space having the three coordinate axes representing the size of a character, the distance from the nearest character, and the confidence level; and associates the coordinate points with the extraction result information (that is, information indicating whether the character is a noise or an actual character) from the noise extraction unit 26. Multiple feature vectors and multiple extraction result information obtained from multiple sample images are plotted in the three-dimensional space in this way, and the plotted result is analyzed, thereby defining a noise region, a character region, or both regions in the three-dimensional space. Information indicating the defined noise region, character region, or both regions serves as a classification model.

In another example, the learning unit 28 causes a neural network to learn a classification model. In this example, the neural network receives a feature vector as an input, and outputs a determination result of whether to regard "a character" corresponding to the feature vector as an actual character or a noise. The learning unit 28 inputs the feature vector input from the feature-vector calculation unit 24 to an input layer of the neural network, and gives, as training data, the extraction result information corresponding to the feature vector input from the noise extraction unit 26 to the neural network. By giving multiple feature vectors and multiple extraction result information to the neural network, the neural network learns a classification model that determines whether to regard a character as a noise or an actual character from a feature vector.

The classification model generated by the leaning at the learning unit 28 is stored in the classification model memory 17.

In the above-described example, the correct answer data 34 indicates the string of characters included in the sample image 32. However, this is merely an example. Alternatively, the correct answer data 34 may be data indicating whether each "character" in a character-string image represented by the sample image 32 is an actual character or a noise. That is, for each character recognition result of a character recognized by the OCR unit 22 from an input image, the correct answer data 34 indicates whether the character is an actual character or a noise. Although it is an example, correct answer data 34 is generated by the OCR unit 22 recognizing a sample image 32, a person viewing the character recognition result of each character obtained as the result of the character recognition, and the person inputting information indicating whether the individual character recognition result is an actual character or a noise. For another example, there is known a system that may obtain a character recognition result with further high reliability by a person checking the character recognition result output by the character recognition apparatus 10. With such a type of system, a pair of a sample image 32 and correct answer data 34 may be generated by recording, as a noise, a character recognition result recognized as not being a character and hence instructed to be removed by a person from among character recognition results of the character recognition apparatus 10 for an input image. That is, the input image serves as a sample image 32; the information that regards a character recognition result instructed to be removed as a noise by a person and that regards a character other than the noise as an actual character from among character recognition results of the input image serves as correct answer data 34; and the sample image 32 and the correct answer data 34 are stored in an associated manner.

If the correct answer data 34 is data indicating whether each "character" in a character-string image represented by the sample image 32 is an actual character or a noise, the noise extraction unit 26 may be omitted. The learning unit 28 may perform learning by using information indicating whether each character is a noise or an actual character, which is indicated by the correct answer data 34.

In the above-described example, the model learning apparatus 20 is constituted as an apparatus separated from the character recognition apparatus 10. For another example, the character recognition apparatus 10 may have therein the function of the model learning apparatus 20. In this case, the OCR unit 22 and the feature-vector calculation unit 24 do not have to be additionally provided in the character recognition apparatus 10, and the OCR unit 12 and the feature-vector calculation unit 14 may have the functions of the OCR unit 22 and the feature-vector calculation unit 24.

An exemplary embodiment of the present disclosure is described above. However, the above-described embodiment is merely an example of the embodiment of the present disclosure.

Other examples of a classification model and determination processing by the noise determination unit 16 are as follows.

In an example, a classification model includes information indicating a range of values of an element when a character is an actual character, for each of three elements (that is, coordinate components) of the size of a character in a feature vector of a character to be recognized, the distance from the nearest character, and the confidence level. The information indicating the range is information indicating the upper limit and the lower limit of the range. Alternatively, the information indicating the range may determine one of the upper limit and the lower limit. In this case, the other one of the upper limit and the lower limit is a value of the lowermost limit or the uppermost limit of values available for the element. In this example, if the value of at least one element of elements of the feature vector obtained by the feature-vector calculation unit 14 for each of a character having a character recognition result, that is, the size of the character, the distance from the nearest character, and the confidence level, is not within the range corresponding to the element, the noise determination unit 16 determines that the character corresponds to a noise. In contrast, if all the three elements of the feature vector fall within the ranges corresponding to the respective elements, the character is an actual character.

For another example, the noise determination unit 16 calculates a score from the three elements of the feature vector obtained by the feature-vector calculation unit 14 for a recognized character, that is, the size of the character, the distance from the nearest character, and the confidence level. The score is a value in which a feature vector is represented by a one-dimensional numerical value. For example, the score is calculated from the feature vector by using a function including the three elements as variables. If the value of a score obtained from a feature vector of a character falls within a predetermined range, the noise determination unit 16 determines that the character corresponds to a noise. In contrast, if the score does not fall within the range, the noise determination unit 16 determines that the character corresponds to an actual character. In this example, the information about the range corresponds to a classification model.

The character recognition apparatus 10 and the model learning apparatus 20 according to the exemplary embodiment described above may be constituted as a logic circuit of hardware. For another example, the information processing apparatus according to the exemplary embodiment may be provided by causing a built-in computer to execute a program representing a function of each functional module in the apparatuses. In this case, the computer includes, for example, as hardware, a circuit configuration in which a processor such as a central processing unit (CPU); memories (primary memories), such as a random access memory (RAM) and a read-only memory (ROM); a hard disk drive (HDD) controller that controls a HDD; various input/output (I/O) interfaces; and a network interface that performs control for connection to a network such as a local area network are connected to one another, for example, via a bus. Moreover, to the bus, for example, a disk drive for reading from and/or writing in a portable disk storage medium, such as a compact disk (CD) or a digital versatile disk (DVD); or a memory reader/writer for reading from and/or writing in a portable non-volatile storage medium of any of various standards, such as a flash memory may be connected via the I/O interface. A program having written therein the processing content of each functional module exemplarily described above is stored in a fixed storage device such as a hard disk drive via a storage medium, such as a CD or a DVD, or via communication means such as a network, and is installed in the computer. The program stored in the fixed storage device is read into a RAM, and executed by a processor such as a CPU. Thus, the functional module group exemplarily described above are provided. Moreover, the character recognition apparatus 10 and the model learning apparatus 20 according to the exemplary embodiment may be constituted by combination of software and hardware.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to
        for each character of a plurality of characters recognized from an image,
            obtain,
                (a) position of the character in the image,
                (b) size of the character, and
                (c) confidence level of a character recognition result of the character, and
            determine whether to regard the character as a noise based on a distance between the character and its nearest character, the size of the character, and the confidence level of the character recognition result of the character.

2. The information processing apparatus according to claim 1,
    wherein the determination of whether to regard the character as a noise is based on whether a point representing the distance, the size, and the confidence level of the character in a three-dimensional space is in a noise region defined in the three-dimensional space.

3. The information processing apparatus according to claim 2, wherein the processor is further configured to
    receive sample images,
    obtain, for each sample image character of a plurality of sample image characters recognized from the sample images, a distance between the sample image character and its nearest sample image character, a size of the sample image character, and a confidence level of a character recognition result of the sample image character, and
    receive correct answer data that indicates whether to regard an element corresponding to the sample image character in the sample images as a noise or an actual character, and
    wherein the noise region is defined based on the correct answer data and the distance, the size, and the confidence level of the sample image character.

4. The information processing apparatus according to claim 1,
    wherein the determination is made by using a neural network that receives the distance, the size, and the confidence level of the character, and outputs information indicating whether to regard the character as a noise or an actual character.

5. The information processing apparatus according to claim 1,
    wherein the character is regarded as a noise if a value of at least one of the distance, the size, or the confidence level of the character is outside a corresponding predetermined range.

6. The information processing apparatus according to claim 1,
    wherein the character is regarded as a noise if a score calculated based on values of the distance, the size, and the confidence level of the character is within a predetermined range.

7. A non-transitory computer readable medium storing a program causing a computer to execute a process for image processing, the process comprising:
    for each character of a plurality of characters recognized from an image,
        obtaining,
            (a) position of the character in the image,
            (b) size of the character, and
            (c) confidence level of a character recognition result of the character; and
        determining whether to regard the character as a noise based on a distance between the character and its nearest character, the size of the character, and the confidence level of the character recognition result of the character.

* * * * *